May 8, 1934.     G. S. ROGERS     1,957,731
LUBRICATING FITTING
Filed May 7, 1932
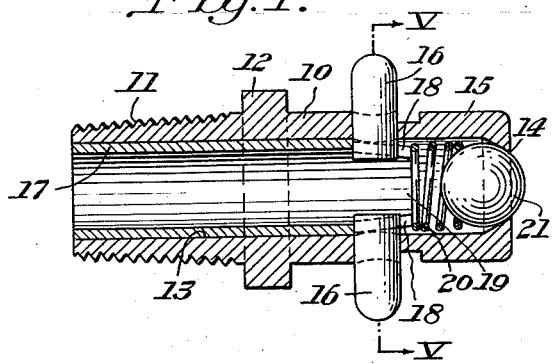
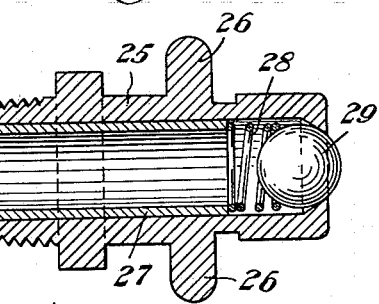
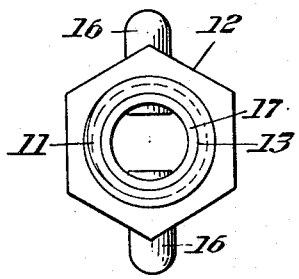
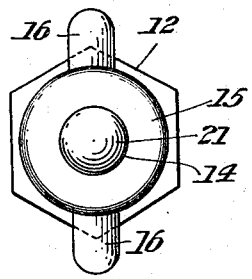
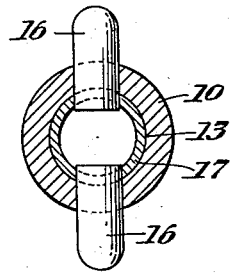
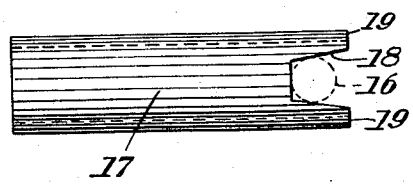
INVENTOR
Gerald S. Rogers
by his attorneys
Byrnes, Stebbins, Parmelee & Blenko Patented May 8, 1934

1,957,731

UNITED STATES PATENT OFFICE 1,957,731

LUBRICATING FITTING

Gerald S. Rogers, Pittsburgh, Pa.

Application May 7, 1932, Serial No. 609,843

1 Claim. (Cl. 184—105)

My invention relates to a fitting or receptacle adapted to be incorporated in machines or other devices at points requiring lubrication.

A number of such devices have been known heretofore but have been found unsatisfactory in certain respects. A device of this character must have a fluid-tight closure to prevent leakage of lubricant supplied thereto. One of the previous fittings of this type includes a pin extending transversely through a tubular barrel, a spring seated on the pin and engaging a ball closure for urging it towards its seat. The spring is supported only at two points, namely, the points of tangency of the lower turn of the spring with the pin. The pin also cooperates externally of the fitting with bayonet slots in a coupling connected to a lubricant dispenser. Since the spring is supported only at two spaced points, the result is that the other portions of the spring sag around the pin and may even slide off altogether. In this case, the effect of the spring in forcing the closure home to its seat is greatly weakened. Since the closure does not seat with the necessary force, leakage from the fitting is the result.

I have invented a lubricating fitting in which a ball closure is moved toward its seat by a spiral spring. A sleeve inserted in the fitting barrel provides support for the lower turn of the spring throughout substantially the entire circumference of the latter. Instead of using a single transverse pin, I prefer to employ separate lugs inserted into the barrel at diametrically opposite points thereof. The spring-supporting sleeve is slotted to receive the ends of the lugs in case they project inwardly of the barrel. In a modified form of the invention, the lugs for engaging the coupling are integral with the barrel instead of inserted therein.

For a complete understanding of the invention, reference is made to the accompanying drawing, in which:

Figure 1 is an axial sectional view through a fitting embodying the invention;

Figure 2 is a similar view of a modified form;

Figure 3 is an end view of the device of Figure 1 looking from the left-hand end of the latter;

Figure 4 is an end view of the other end of the fitting;

Figure 5 is a transverse sectional view taken along the plane of line V—V of Figure 1; and Figure 6 is a side elevation of the inserted sleeve.

Referring in detail to the drawing, the invention comprises a tubular barrel 10, one end of which is threaded as at 11 whereby the fitting may be screwed into machine parts adjacent portions thereof requiring lubrication. A hexagonal wrench-receiving portion 12 is formed integral with the barrel. A longitudinal bore 13 extends through the barrel but tapers to a hole 14 of smaller diameter in the unthreaded end 15 of the barrel.

Lugs 16 are inserted into the barrel at diametrically opposite points thereof. A sleeve 17 having slots 18 and projecting ends 19 is pressed into the bore 13 so as to have a tight frictional fit therein.

A spiral spring 20 is seated on the projecting ends 19 of the sleeve 17. A ball closure 21 is seated in a tapered portion of the bore 13. The spring 20 normally forces the closure firmly against its seat.

When a suitable coupler, such as that shown, described and claimed in my co-pending application, Serial No. 609,844, filed May 7, 1932, for Coupling, is attached to the fitting by means of the lug 16, the closure 21 is forced from its seat to open a path into the interior of the sleeve 17 for the lubricant which is forced therein under pressure. When the pressure is released, the spring 20 immediately reseats the closure 21 with a considerable force so that leakage from the end of the barrel is impossible. Since the spring 20 is firmly supported by the projections 19 on the sleeve 17 throughout substantially the entire portion of its circumference, except for the width of the slots 18, the spring exerts a much greater force on the closure than would be exerted by the spring if it were supported only at two points of tangency with a pin extending transversely through the barrel.

A modified form of the invention illustrated in Figure 2 is quite similar to that of Figure 1 except that a barrel 25 has lugs 26 formed integral therewith. A sleeve 27 forced into the bore of the barrel supports a spring 28 throughout its entire circumference for forcing the ball closure 29 toward its seat. Since the lugs 26 do not project inside the barrel 25, the sleeve 27 need not be slotted and thus provides additional supporting surface for the lower coil of the spring 28.

By the term "lower coil" used herein I intend to refer to the turn of the spiral spring which engages the supporting sleeve.

It will be apparent from the foregoing that the invention described herein is an improvement upon similar devices known heretofore in that the closure is seated more tightly because of the much greater supporting area provided for the closing spring. In tests, the invention has demonstrated its capability of sustaining as high as three thousand pounds pressure per square inch within the barrel without trace of leakage past the ball closure.

Although I have illustrated and described but one preferred embodiment of the invention and the modification thereof, it will be apparent that it may be embodied in other forms than those shown without departing from the spirit of the appended claim or sacrificing any of the advantages mentioned.

I claim:

In a lubricating fitting, the combination with an integral tubular barrel having an axial bore, a closure seat at one end of said bore, the other end of the barrel being externally threaded, a closure on said seat, and a spring for seating the closure, of a pin projecting through the wall of the barrel at one point at least, and a sleeve inserted in said barrel, said sleeve engaging said spring to cause seating of the closure, said sleeve being notched to clear said pin.

GERALD S. ROGERS.